United States Patent [19]

Heins et al.

[11] 4,246,156

[45] Jan. 20, 1981

[54] PROCESS FOR THE PRODUCTION OF EMULSIFIER-FREE, SELF-CROSSLINKABLE RUBBER LATICES

[75] Inventors: Ferdinand Heins, Erkrath; Martin Matner, Odenthal, both of Fed. Rep. of Germany

[73] Assignee: Bayer Aktiengesellschaft, Fed. Rep. of Germany

[21] Appl. No.: 55,184

[22] Filed: Jul. 6, 1979

[30] Foreign Application Priority Data

Jul. 11, 1978 [DE] Fed. Rep. of Germany ........ 2830455

[51] Int. Cl.$^3$ ................................................ C08F 2/22
[52] U.S. Cl. ............................ 260/29.7 H; 526/304
[58] Field of Search ................... 260/29.7 H; 526/304

[56] References Cited

U.S. PATENT DOCUMENTS

| | | | |
|---|---|---|---|
| 2,868,755 | 1/1959 | Medalia | 260/29.7 H |
| 2,913,429 | 11/1959 | Floria | 260/29.7 H |
| 2,914,499 | 11/1959 | Sheetz | 260/29.7 H |
| 3,306,871 | 2/1967 | Miller | 260/29.7 H |
| 3,344,103 | 9/1967 | Eilbeck | 428/245 |
| 3,784,498 | 1/1974 | Ceska | 260/29.6 TA |
| 3,799,901 | 3/1974 | McCann | 260/29.7 H |
| 3,882,070 | 5/1976 | Ceska | 260/29.7 T |
| 3,966,661 | 6/1976 | Feast | 260/29.7 H |

*Primary Examiner*—Paul R. Michl
*Attorney, Agent, or Firm*—Connolly and Hutz

[57] ABSTRACT

A process for the production of an emulsifier-free self-crosslinkable rubber latex (meth)acrylic acid, N-alkoxymethyl (meth)acrylamide and acyclic conjugated dienes arylvinyl monomers and/or (meth)acrylonitrile, wherein an aqueous emulsion is prepared by adding at least part of the (meth)acrylic acid, part of the diene and further monomers to water, the polymerization reaction is initiated by the addition of an aqueous solution of a peroxodisulphate and is carried out in a first stage at a pH-value of from 3.5 to 7 until at least 50% of the monomers have been polymerized, the rest of the monomers and initiator are added in one or more further stages and the polymerization reaction is continued at a pH-value of from 3.5 to 7 until at least 50% of the monomers and, in the last stage, until from 85 to 100% of the monomers have been polymerized.

7 Claims, No Drawings

PROCESS FOR THE PRODUCTION OF EMULSIFIER-FREE, SELF-CROSSLINKABLE RUBBER LATICES

This invention relates to a process for the production of emulsifier-free, self-crosslinkable rubber latices of (meth)acrylic acid, N-alkoxymethyl (meth)acrylamide and acyclic conjugated dienes together with arylvinyl monomers and/or (meth)acrylonitrile.

In conventional emulsion polymerisation processes, the monomers are normally polymerised in the presence of an initiator which releases free radicals and an emulsifier which keeps the polymer particles formed in dispersion. However, the presence of emulsifiers frequently leads to difficulties in the processing of the latices due to inadequate mechanical stability or to foam formation and results in a reduction in the wet strength of the coatings produced with dispersions such as these or of the substrates treated with them and in reduced adhesion of the binder to the substrates.

It is known that the stability of rubber latices can be increased and the sensitivity of the films to water can be reduced by carrying out the emulsion polymerisation reaction in the presence of emulsifiers which are incorporated into the polymer, such as for example semiesters of maleic acid and fatty alcohols (German Auslegeschrift No. 1,011,548) or 4-styrene undecanoic acid (U.S. Pat. No. 2,868,755). This internal binding of the surface-active substances considerably reduces the sensitivity of the latices to shear forces by comparison with latices of the type in which the polymer particles are stabilised by the adsorption of emulsifier molecules.

The incorporation of monomers containing strongly dissociating groups also produces rubber latices which show considerably greater stability than rubber latices containing adsorbed surface-active substances. Stable emulsifier-free rubber latices of this type are obtained by copolymerising monomers containing sulphonic acid groups in aqueous emulsion, for example by the incorporation of 4-styrene sulphonic acid (U.S. Pat. Nos. 2,913,429 and 3,306,871) or of esters of acrylic or methacrylic acid and 2-hydroxyethane sulphonic acid, such as for example 2-sulphoethyl acrylate (U.S. Pat. No. 2,914,499). In this way, the latex particles are stabilised by sulphonate groups which provide an adequate charge on the surface of the particles.

It is known from U.S. Pat. No. 3,784,498 that emulsifier-free carboxylated rubber latices can be obtained by initially preparing a latex from the total quantity of the ethylenically unsaturated carboxylic acid and part of the water-insoluble monomers at a pH-value of from about 2 to 4, adding the rest of the monomers after the pH-value has been adjusted to between 7 and 10 and continuing polymerisation until a complete conversion is obtained. This measure drastically increases the dissociation of the carboxyl groups so that the polymer particles are adequately stabilised by the carboxylate groups during the second polymerisation stage, thus avoiding coagulation. However, the necessary increase in the pH-value from 2–4 to 7–10, for which aqueous ammonia is preferably used, complicates the process because the ammonia has to be added slowly and carefully and, in many cases, leads to considerable coagulate formation.

It is also known that carboxylated butadiene/styrene or butadiene/acrylonitrile latices having self-crosslinking properties can be produced in the presence or absence of emulsifiers by copolymerising N-methylol acrylamide or methacrylamide as the heat-reactive component (U.S. Pat. No. 3,344,103).

U.S. Pat. No. 3,882,070 describes the use of N-methylol acrylamide as a co-catalyst in the production of emulsifier-free rubber latices, which is said to promote the formation of terminal sulphate groups from the peroxodisulphate used as initiator.

However, the use of peroxodisulphate as initiator requires polymerisation temperatures above about 70° C. because it is only in this way that sufficiently rapid decomposition of the peroxodisulphate and, hence, adequate polymerisation velocities can be obtained. However, since relatively long polymerisation times are required in the absence of emulsifiers, even where relatively large quantities of initiator are used, owing to the poor solubility in water of the conjugated dienes or aromatic vinyl compounds, particularly where molecular weight regulators are present, the use of N-methylol acrylamide or methacrylamide at the relatively high polymerisation temperatures and low pH-values applied gives rise during the actual polymerisation reaction to substantial crosslinking of the polymer which is often reflected in the formation of considerable quantities of coagulate, with the result that the technical possibilities of producing corresponding latices are severely limited (U.S. Pat. No. 3,344,103).

It has now been found that emulsifier-free self-crosslinkable carboxylated latices can be obtained from (meth)acrylic acid, N-alkoxymethyl (meth)acrylamide, dienes and arylvinyl monomers and/or (meth)acrylonitrile using a peroxodisulphate as radical initiator, providing at least part of the (meth)acrylic acid, part of the diene and other monomers are polymerised at a pH-value of from 3.5 to 7, the rest of the monomers are added in one or more stages and the polymerisation reaction is carried out at this pH-value until at least 50% of the monomers have been converted and, in the final stage, until from 85 to 100% of the monomers have been converted. The process according to the invention enables corresponding rubber latices to be produced without using emulsifiers. The self-crosslinking properties are obtained by the copolymerisation of N-alkoxymethyl acrylamides and/or methacrylamides. The use of alkyl ethers instead of the free N-methylol compounds reduces the reactivity of the self-crosslinking groups to such an extent that they remain sufficiently intact during the polymerisation reaction and latices of considerably higher stability are obtained.

The process is generally carried out by initially introducing water and at least part of the (meth)acrylic acid, part of the conjugated diene, the arylvinyl monomers and/or the (meth)acrylonitrile and, optionally, N-alkoxymethyl (meth)acrylamide into a reactor and initiating the polymerisation reaction at a temperature above 70° C., preferably at a temperature in the range of from 75° to 95° C., by the addition of an aqueous, preferably ammoniacal peroxodisulphate solution of which the ammonia content is measured in such a way that polymerisation takes place at a pH-value in the range of from 3.5 to 7. Polymerisation is continued up to a conversion of at least 50% and, depending on the pressure conditions in the reactor and the required final concentration, more monomer, N-alkoxymethyl (meth)acrylamide and, optionally, (meth)acrylic acid and more aqueous, preferably ammoniacal peroxodisulphate solution are added in batches so that the polymerisation reaction is continued at a pH-value of from 3.5 to 7.

In general, two or three stages are sufficient for this polymerisation reaction, although more polymerisation stages are also possible. In each polymerisation stage, polymerisation is continued until a conversion of at least 50% is obtained. In the final stage, polymerisation is continued up to a conversion of from 85 to 100% of the monomers. A latex having a solids content of from 30 to 65% by weight and preferably from 40 to 60% by weight is obtained.

Both organic and also inorganic bases, for example NaHCO$_3$, ammonia or triethylamine, are suitable for adjusting the pH to a value of from 3.5 to 7 during the polymerisation reaction. It is preferred to use aliphatic amines and ammonia, ammonia being particularly preferred.

The total quantity of the peroxodisulphate used as initiator in the process according to the invention amounts to between 0.5 and 3.0 parts by weight, based on the total quantity of monomers. Suitable initiators are salts of peroxodisulphuric acid, such as sodium, potassium or, preferably, ammonium peroxodisulphate. In one preferred embodiment, the individual polymerisation stages are initiated by the addition of an aqueous ammoniacal peroxodisulphate solution which simultaneously adjusts the pH-value to 3.5–7.

Surprisingly, the process according to the invention can be applied so universally that the ratio of conjugated diene to arylvinyl monomer and/or (meth)acrylonitrile can be varied within very wide limits. Accordingly, it is possible in accordance with the invention to produce from the above-mentioned monomers rubber latices which contain from 10 to 90 parts by weight of one or more acyclic conjugated dienes containing from 4 to 9 carbon atoms, from 0 to 90 parts by weight of one or more arylvinyl monomers containing from 8 to 12 carbon atoms and/or from 0 to 50 parts by weight of (meth)acrylonitrile, the sum of the last two components amounting to between 10 and 90 parts by weight.

Accordingly, the present invention provides a process for the production of an emulsifier-free, self-crosslinkable rubber latex of 1 to 6 parts by weight of (meth)acrylic acid, 0.5 to 6 parts by weight of N-alkoxymethyl (meth)acrylamide and 88 to 98.5 parts by weight of a mixture of 10 to 90 parts by weight of one or more acyclic conjugated dienes containing from 4 to 9 carbon atoms and 10 to 90 parts by weight of one or more arylvinyl monomers containing from 8 to 12 carbon atoms and/or (meth)acrylonitrile, the quantity of (meth)acrylonitrile amounting to at most 50 parts by weight, characterised in that (a) an aqueous emulsion is prepared by adding at least part of the (meth)acrylic acid, part of the diene and other monomers to water, (b) polymerisation is initiated by the addition of an aqueous solution of a peroxodisulphate, (c) polymerisation is carried out in a first stage at a pH-value of from 3.5 to 7 and at a temperature above 70° C. until at least 50% of the monomers have been converted, (d) the rest of the monomers and more aqueous peroxodisulphate solution are added in one or more further stages, (e) the polymerisation reaction is continued at a pH-value of from 3.5 to 7 and at a temperature above 70° C. until at least 50% of the monomers have been converted and, in the final stage, until from 85 to 100% of the monomers have been converted.

Suitable acyclic conjugated dienes containing from 4 to 9 carbon atoms are, for example, 1,3-butadiene, 2-methyl-1,3-butadiene (isoprene), 2,3-dimethyl-1,3-butadiene, piperylene, 2-neopentyl-1,3-butadiene and other substituted dienes such as, for example, 2-chloro-1,3-butadiene (chloroprene), 2-cyano-1,3-butadiene and also substituted straight-chain conjugated pentadienes and straight-chain or branched-chain hexadienes. Its ability to copolymerise particularly well with arylvinyl monomers makes 1,3-butadiene the preferred monomer.

Suitable arylvinyl monomers are those in which the vinyl group, optionally alkyl-substituted in the α-position, is directly attached to an aromatic nucleus consisting of from 6 to 10 carbon atoms, for example styrene and substituted styrenes, such as 4-methyl styrene, 3-methyl styrene, 2,4-dimethyl styrene, 2,4-diethyl styrene, 4-isopropyl styrene, 4-chlorostyrene, 2,4-dichlorostyrene, divinyl benzene, α-methyl styrene and vinyl naphthalene. For reasons of availability and by virtue of its ability to copolymerise effectively, particularly with 1,3-butadiene, styrene is the preferred monomer.

The alkyl ethers of N-methylol acrylamide and/or methacrylamide used for carrying out the process according to the invention are those which contain from 1 to 4 carbon atoms in the alkoxy group, particularly N-methoxymethyl (meth)acrylamide and N-n-butoxymethyl (meth)acrylamide.

Up to 25 parts by weight of the non-dissociating monomers may be replaced by one or more monomers which can be copolymerised with the above-mentioned monomers. Monomers such as these are acrylic and/or methacrylic acid esters of alcohols containing up to 8 carbon atoms and also diesters of alkane diols and α,β-monoethylenically unsaturated monocarboxylic acids, such as ethylene glycol diacrylate and 1,4-butane diol diacrylate, and amides of α,β-monoethylenically unsaturated mono- and di-carboxylic acids, such as acrylamide and methacrylamide.

Further comonomers which may be used for the purposes of the invention include vinyl esters of carboxylic acids containing from 1 to 18 carbon atoms, particularly vinyl acetate and vinyl propionate, vinyl chloride and vinylidene chloride, vinyl ethers, such as vinyl methyl ether, vinyl ketones, such as vinyl ethyl ketone, and heterocyclic monovinyl compounds, such as vinyl pyridine.

In addition to the above-mentioned monomers, known chain-transfer agents may be used for influencing the properties of the copolymers. Suitable chain-transfer agents are long-chain alkyl mercaptans such as, for example, tert.-dodecyl mercaptan, mercaptocarboxylic acids, such as thioglycolic acid, lower dialkyl dixanthogenates, carbon tetrabromide and bromoethyl benzene. The quantity in which the chain transfer agent is used is determined inter alia by its effectiveness and also by the quantity in which the diene is used and may readily be selected by the expert.

As already mentioned, the process according to the invention is a polymerisation process which is carried out in two or more stages, the number of stages being determined by the pressure conditions in the reactor and by the required final concentration of the latex. Depending on the number of polymerisation stages, about half the total of non-dissociating monomers is initially introduced in a two-stage operation, about a third in a three-stage operation, and so on. Accordingly, the monomers are added in substantially equal portions commensurate with the number of stages. This also applies to the (meth)acrylic acid, although it is also possible for the methacrylic acid to be completely introduced in the first stage alone.

In the first stage, the polymerisation reaction is carried out until a conversion of at least 50% is obtained. In the majority of cases, complete polymerisation in the first stage is unadvisable because, in many cases, this measure leads to the formation of deposits and microcoagulate. In the first stage, polymerisation is preferably carried out up to a conversion of from 70 to 85% by weight, after which a second batch of the non-dissociating monomers is added, more aqueous peroxodisulphate solution is introduced and polymerisation is continued at a pH-value of from 3.5 to 7. The addition of more acrylic and/or methacrylic acid is governed by the total quantity of the acid which may amount to between 1 and 6 parts by weight, based on the monomer total. When only 1 part by weight is used, the total quantity of (meth)acrylic acid is introduced in the first stage, although when a larger quantity is used it is generally more favourable to distribute the acid between the individual polymerisation stages. In the second polymerisation stage and in each following polymerisation stage, polymerisation is continued until all the monomers then present have been polymerised up to a conversion of at least 50%. Finally, in the last stage, polymerisation is continued until from 85 to 100% of the monomers have been converted.

It has proved to be particularly advisable not to add the N-alkoxymethyl (meth)acrylamide until the last stage in order to ensure that the masked N-methylol amide is only briefly kept at the relatively high polymerisation temperature, thereby largely forestalling pre-crosslinking. Although it is possible in principle to add the masked N-methylol compound in a preliminary polymerisation stage, for example in the first stage, or over several stages, deposits or microcoagulate are increasingly formed in this case. If, by contrast, the masked N-methylol (meth)acrylamides are added in the last stage, the formation of deposits or microcoagulate can be avoided.

In many cases, it is sufficient to carry out the process in only two stages. In the first stage, polymerisation is carried out up to a conversion of at least 50% and, in the second stage, it is continued up to a conversion of from 85 to 100%. The latex may then be freed from residual monomers in known manner at a pH of from 6 to 8 and may be adjusted to a pH-value of from about 8 to 10 in order to increase its mechanical stability.

The process according to the invention produces emulsifier-free self-crosslinkable rubber latices which have extremely high stability with respect to chemical and mehcanical influences, show very little foam formation during processing, are compatible with other emulsifier-free or emulsifier-containing latices and with liquid phenolic resins, and may readily be concentrated by the removal of water. The polymer films produced from these latices and articles produced with these dispersions show considerably improved resistance to water, dry and harden more quickly, adhere much more firmly to the particular substrates and show far less discoloration by comparison with articles produced from dispersions containing even small quantities of emulsion. Polymer films and products with improved resistance to water are obtained in particular from alkali-metal-free latices in the production of which ammonia is used for adjusting the pH-value and ammonium peroxodisulphate as initiator. The latices produced in accordance with the invention are surprisingly distinguished by their versatility in terms of practical application and may be used for example as a leather finish, for bonding nonwoven fabrics, for impregnating and coating textile materials and papers, and for the production of adhesives, printing inks and aqueous paint binder formulations. The additional incorporation of monomers with self-cross-linking groups also makes the latices according to the invention more suitable than non-self-crosslinkable polymer dispersions for most of the applications mentioned here, because it is possible simply by heating them to sufficiently high temperatures, i.e. without adding vulcanising or crosslinking agents, to obtain considerable improvements in the service properties of the end products, for example increased resistance to boiling water and organic solvents.

The process according to the invention is illustrated by the following Examples.

EXAMPLE 1

In a 40 liter stainless steel autoclave equipped with a crossed-arms paddle stirrer, a solution of 111 g of 90% methacrylic acid in 250 g of water and a solution of 120 g of ammonium peroxodisulphate and 30 ml of a 25% aqueous ammonia solution in 500 g of water are added at 80° C. to a mixture of 2500 g of 1,3-butadiene, 2300 g of styrene, 8750 g of water and 10 g of tert.-dodecyl mercaptan. After a polymerisation time of 4 hours at a constant pH-value of 4.3, a solids concentration of approximately 20% by weight is reached. A mixture of 2500 g of 1,3-butadiene, 2300 g of styrene, 200 g of N-methoxymethyl methacrylamide, 111 g of 90% methacrylic acid and 30 g of tert.-dodecyl mercaptan and a solution of 80 g of ammonium peroxodisulphate and 40 ml of a 25% aqueous ammonia solution in 500 g of water are then added and polymerisation is continued at a substantially constant pH-value of 4.5. After about 11 hours, a solids concentration of 44% by weight is reached. The latex is cooled and 280 g of a 7% diethyl hydroxylamine solution are added to stop polymerisation. The polymerisation mixture is then substantially neutralised with a dilute aqueous ammonia solution and the latex is freed from residual monomers in vacuo, leaving a substantially coagulate-free latex with a solids content of 44.4% by weight, a surface tension of 48.0 mN/m at pH 6.0 and a particle diameter of from about 250 to 270 nm.

This product is suitable for bonding cellulose and leather fibres for the production of inner sole materials for shoes.

Crosslinking test:

An antioxidant is added to the latex and the pH is then adjusted to 3.0 with an aqueous oxalic acid solution. The elongation at break of a 0.6 mm thick polymer film dried at room temperature amounts to 1050% and, after vulcanisation for 2.5 minutes at 150° C., to 840%.

COMPARISON EXAMPLE 1

The procedure is as described in Example 1, except that the N-methoxymethyl methacrylamide added in the second polymerisation stage is replaced by the same quantity of N-methylol acrylamide. The pH-profile and the polymerisation times are substantially the same as in Example 1. In this test, however, coagulate is formed in such large quantities that the latex cannot be economically produced and used.

The latex obtained after working up in the same way as in Example 1 and after the removal of deposits by filtration has a solids content of 44.3% by weight, a pH-value of 5.8 and a surface tension of 47.3 mN/m. The particle diameters lie between about 250 and 280 nm. Crosslinking test:

An antioxidant is added to the latex and the pH is then adjusted to 3.0 with aqueous oxalic acid solution. A 0.7 mm thick film dried at room temperature shows an elongation at break of 940%. After tempering for 2.5 minutes at 150° C., its elongation at break amounts to only 660%.

EXAMPLE 2

A 40 liter stainless steel reactor equipped with a crossed-arms paddle stirrer is filled with 12,500 g of water, 1200 g of acrylonitrile, 1200 g of styrene, 2400 g of 1,3-butadiene and 10 g of tert.-dodecyl mercaptan, followed by the addition at 75° C. of a solution of 222 g of 90% methacrylic acid in 250 g of water and a solution of 100 g of ammonium peroxodisulphate and 30 ml of a 25% aqueous ammonia solution in 500 g of water. After a polymerisation time of 3 hours at 75° C. and an increase in pH from 3.7 to 4.1, a solids concentration of 19% by weight is reached. This is followed by the addition in a second stage of a monomer mixture of 1200 g of acrylonitrile, 1200 g of styrene, 2400 g of 1,3-butadiene, 200 g of N-methoxymethyl methacrylamide and 40 g of tert.-dodecyl mercaptan. A solution of 100 g of ammonium peroxodisulphate and 30 ml of a 25% aqueous ammonia solution in 500 g of water is then added. After polymerisation for another 8 hours at 75° C. and an increase in pH from 4.9 to 5.4, a solids concentration of 43.0% by weight is reached. The latex is cooled and the polymerisation reaction is stopped in the same way as in Example 1. The polymerisation mixture is then substantially neutralised with dilute aqueous ammonia solution and the latex is freed from residual monomers in vacuo, leaving a substantially coagulate-free latex having a solids content of 47.9% by weight, a pH-value of 5.2 and a surface tension of 47.6 mN/m. The dispersion has a wide particle size distribution with particle diameters between about 260 and 760 nm.

This product is suitable for use as a surface coat in the production of adhesive tapes. Crosslinking test:

After the addition of an antiager, the pH is adjusted to 3.0 with aqueous oxalic acid solution and the latex is dried at room temperature to form a 0.7 mm thick film. The film has an elongation at break of 1090%. After heating for 2.5 minutes at 150° C., its elongation at break amounts to 730%.

EXAMPLE 3

In a 40 liter stainless steel autoclave equipped with a crossed-arms paddle stirrer, a solution of 222 g of 90% methacrylic acid in 500 g of water and a solution of 50 g of ammonium peroxodisulphate and 30 ml of a 25% aqueous ammonia solution in 500 g of water are added at 75° C. to 12500 g of water, 2200 g of 1,3-butadiene, 1100 g of acrylonitrile and 10 g of tert.-dodecyl mercaptan. After polymerisation for 4.5 hours at 75° C. and an increase in pH from 3.9 to 4.4, a solids concentration of 14.6% by weight is reached. A mixture of 2200 g of 1,3-butadiene, 1000 g of acrylonitrile and 40 g of tert.-dodecyl mercaptan is then added, followed by the introduction of a solution of 50 g of ammonium peroxodisulphate and 15 ml of a 25% aqueous ammonia solution in 250 g of water. After polymerisation for another 3.5 hours and an increase in pH from 4.8 to 5.9, a solution of 2200 g of 1,3-butadiene, 900 g of acrylonitrile, 200 g of N-methoxymethyl methacylamide and 40 g of tert.-dodecyl mercaptan is introduced, followed by addition of the same ammoniacal ammonium peroxodisulphate solution as added at the start of the second polymerisation phase. When a solids concentration of around 38% by weight is reached, a solution of 20 g of ammonium peroxodisulphate in 100 g of water is added to activate polymerisation. In the third polymerisation phase, the pH-value remains substantially constant at 6.1. At a solids concentration of 39.1% by weight, which is reached after a total polymerisation time of 20 hours, the polymerisation mixture is cooled, the polymerisation reaction is stopped by the addition of 280 g of a 7% diethyl hydroxylamine solution and the latex is freed from residual monomers in vacuo.

A substantially coagulate-free latex is obtained, having a solids content of 39.3% by weight, a pH-value of 6.1 and a wide particle size distribution with particle diameters between about 140 and 560 nm. The latex has a surface tension of 50.0 mN/m.

The latex is particularly suitable for the production of non-woven wadding materials.

We claim:

1. A process for the production of an emulsifier-free self-crosslinkable rubber latex from 1 to 6 parts by weight of (meth)acrylic acid, 0.5 to 6 parts by weight of N-alkoxymethyl (meth)acrylamide and 88 to 98.5 parts by weight of a mixture of 10 to 90 parts by weight of one or more acyclic conjugated dienes containing from 4 to 9 carbon atoms and 10 to 90 parts by weight of one or more arylvinyl monomers containing from 8 to 12 carbon atoms and/or (meth)acrylonitrile, the quantity of (meth)acrylonitrile amounting to at most 50 parts by weight, characterised in that
   (a) an aqueous emulsion is prepared by adding at least part of the (meth)acrylic acid, part of the diene and further monomers to water,
   (b) the polymerisation reaction is initiated by the addition of an aqueous solution of a peroxodisulphate,
   (c) polymerisation is carried out in a first stage at a pH-value of from 3.5 to 7 and at a temperature above 70° C. until at least 50% of the monomers have been polymerised,
   (d) the rest of the monomers and more aqueous peroxodisulphate solution are added in one or more further stages,
   (e) the polymerisation reaction is continued at a pH-value of from 3.5 to 7 and at a temperature above 70° C. until at least 50% of the monomers have been polymerised and, in the last stage, until from 85 to 100% of the monomers have been polymerised.

2. A process as claimed in claim 1, characterised in that up to 25 parts by weight of the non-dissociating monomers are replaced by other copolymerisable monomers.

3. A process as claimed in claim 1, characterised in that the N-alkoxymethyl acrylamide and/or N-alkoxymethyl methacrylamide are added in the final polymerisation stage.

4. A process as claimed in claim 1, characterised in that an N-alkoxymethyl (meth)acrylamide containing from 1 to 4 carbon atoms in the alkoxy group is used.

5. A process as claimed in claim 1, characterised in that the total quantity of the peroxodisulphate used as initiator amounts to between 0.5 and 3.0 parts by weight, based on the monomer total.

6. A process as claimed in claim 1, characterised in that the polymerisation reaction is carried out in the presence of a chain-transfer agent.

7. An emulsifier-free self-crosslinkable rubber latex produced by the process claimed in claim 1.

* * * * *